United States Patent
Dixon et al.

[11] Patent Number: 6,024,413
[45] Date of Patent: Feb. 15, 2000

[54] BICYCLE WHEEL AND RIM

[75] Inventors: William Dixon, San Diego, Calif.; Ben M. Spencer, Seattle, Wash.

[73] Assignee: Spencer Technology, Inc., Richland, Wash.

[21] Appl. No.: 08/923,160

[22] Filed: Sep. 4, 1997

[51] Int. Cl.[7] .................................................. B60B 1/02
[52] U.S. Cl. ............................. 301/58; 301/55; 301/97; 301/98; 301/110.5
[58] Field of Search ............................. 301/55, 58, 95, 301/96, 97, 98, 110.5

[56] References Cited

U.S. PATENT DOCUMENTS

| | | | |
|---|---|---|---|
| 308,794 | 12/1884 | Pratt | 301/58 |
| 365,091 | 6/1887 | Owen | 301/58 |
| 4,621,827 | 11/1986 | Klein | 280/281 |
| 5,228,756 | 7/1993 | Krampera | 301/58 |
| 5,445,439 | 8/1995 | Dietrich | 301/58 |
| 5,452,945 | 9/1995 | Schlanger | 301/58 |
| 5,486,223 | 1/1996 | Carden | 419/14 |
| 5,490,719 | 2/1996 | Lew | 301/5.1 |
| 5,499,864 | 3/1996 | Klein et al. | 301/95 |
| 5,573,608 | 11/1996 | Miyake et al. | 148/552 |
| 5,597,529 | 1/1997 | Tack | 420/532 |
| 5,653,510 | 8/1997 | Osborne | 301/95 |
| 5,734,142 | 3/1998 | Kazmierczak | 3010/96 |
| 5,806,935 | 9/1998 | Shermeister | 301/58 |

FOREIGN PATENT DOCUMENTS

| | | | |
|---|---|---|---|
| 14945 | 12/1885 | United Kingdom | 301/97 |
| 2051700 | 1/1981 | United Kingdom | 301/97 |

*Primary Examiner*—D. Glenn Dayoan
*Assistant Examiner*—Long Bao Nguyen
*Attorney, Agent, or Firm*—Davis Wright Tremaine LLP

[57] ABSTRACT

An impact resistant extrudable alloy spoked wheel having a rim with an integral transverse curved torque converter yolk portion integral with the rim side wall portions forming an angle of about 20 degrees to about 45 degrees with a horizontal plane and with a radius of curvature of about 0.22 inches to about 0.34 inches; including aluminum alloys, magnesium alloys, a titanium alloys, a beryllium alloys or mixtures thereof with ceramic particles selected from among alumina, silicon carbide, aluminum nitride, Boron carbide and silicon nitride.

12 Claims, 6 Drawing Sheets

BICYCLE WHEEL AND RIM

FIELD OF THE INVENTION

The invention relates generally to impact-resistant bicycle wheels and rims.

BACKGROUND OF THE INVENTION

The recent rise in popularity of high-performance mountain biking and off-road racing as serious professional and recreational sports have lead to challenging problems for bicycle manufacturers and designers. Metal fatigue, stress fracturing, and structural shattering are common consequences of severe impact forces encountered at high speeds on rough terrain. Strengthening impact resistance of rims by increasing wall thickness has the undesirable consequence of added weight. Attempts have been made to provide lightweight solutions using composite polymeric fiber-resin matrix wheels such as those disclosed in U.S. Pat. Nos. 5,540,485; 4,930,843; and, 5,246,275. These materials offer resilient properties, but create a difficult braking surface. Mountain-biking enthusiasts also complain that the wheels are not stable and require frequent adjustment to keep them in alignment. In addition, composite materials are expensive, production methods are complicated and generate toxic byproducts, both of which contribute to higher unit manufacturing costs.

In one alternative approach, Klein et al. (U.S. Pat. No. 5,499,864) disclose a truss type section geometry that reportedly attempts to maximize bending and torsional stiffness and strength while minimizing weight. Unfortunately, maximizing stiffness may decrease resilience and actually increase impact-related stress fracturing along angular planes within a rim profile. It would be highly desirable to have bicycle wheels with both increased stiffness and strength, but also some degree of resilience to improve impact resistance and decrease stress fracturing.

Aluminum metal matrix composite (MMC) are commercially available for extrusion use manufacturers of extrusion billets produced using powder metallurgy, spray and casting techniques. Ideally, to avoid interfacial failures between the matrix and particulate, MMC have an even distribution of fully wetted particles. Uniform aluminum MMC have reportedly be produced by mixing particulate suspensions of aluminum oxide ($Al_2O_3$) into a low-silicon magnesium-aluminum alloy, e.g., 6061 or 2014, under controlled conditions including vacuum, e.g. a process such as that disclosed in U.S. Pat. No. 4,759,995. Addition of ceramic metal particles to aluminum alloys is reported to impart several different properties to the resultant MMC material: namely, decreased elongation (%), increased yield and ultimate strength (ksi) and Young's modulus stiffness (msi), but also with an increase in density ($lb/in^3$). In use, however, properties of MMC are somewhat less predictable because they may change somewhat during extrusion, casting and forging with changes in microstructure, e.g., interfacial dynamics at particle-matrix boundaries, particle alignment, and/or settling of particles into gradients. MMC have recently found uses in non-aerospace applications including automobile drive shafts and brake rotors, and a bicycle frame marketed by Specialized™ as "M2™" is reportedly of an MMC aluminum alloy.

Objects of the invention provide high-impact-resistant bicycle wheels assembled from MMC rim extrusions having a rim profile capable of spreading compression loads in a manner designed to take advantage of the structural properties of metal alloy MMC materials.

SUMMARY OF THE INVENTION

A spoked wheel rim profile capable of cost-effective extrusion from higher density alloy materials, including MMC aluminum alloys, is disclosed. Higher density alloys such as metal matrix composite aluminum alloys may be difficult and costly to extrude because of excessive tool and die wear, particularly if they contain particulate abrasive materials such as alumina, carbides and the like. The rim profile disclosed herein has gentle angular offsets and transitions smoothly between planar surfaces resulting in lower die wear. The resultant extruded rim provides better compression and side impact resistance, longer life, reduced stress and fatigue impact cracking, more even spreading and distribution of load forces throughout the rim structure, and accommodates use of stiffer, higher density, and inherently more brittle alloy materials. The improved wheels assembled using the disclosed rim extrusions have other improved performance characteristics including more even tire tracking and braking on wet and dry surfaces, resulting in longer tire and brake life. The spoked wheels assembled from the extruded rims find a variety of uses in motor- and man-driven, wheel chairs, bicycles, motor cycles and the like.

DETAILED DESCRIPTION OF THE PREFERRED EMBODIMENTS

Figure 1A:
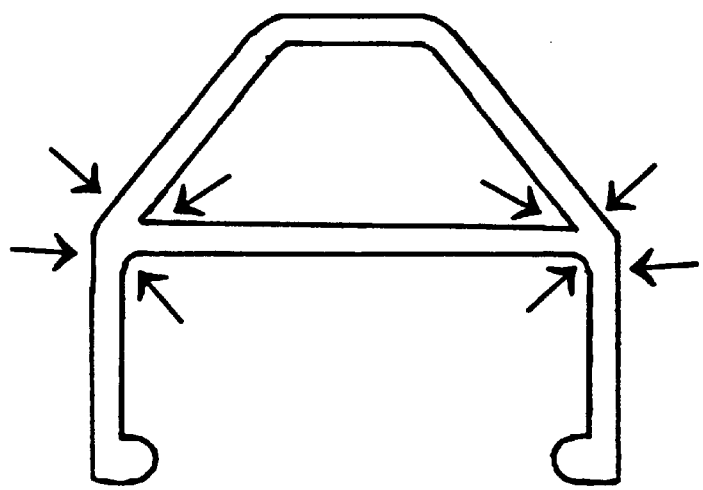
FIG. 1A, 1B and 1C depict three different prior art bicycle rim profiles. Arrows depict locations at which stress fractures may occur as a result of impact forces.
Figure 1B:
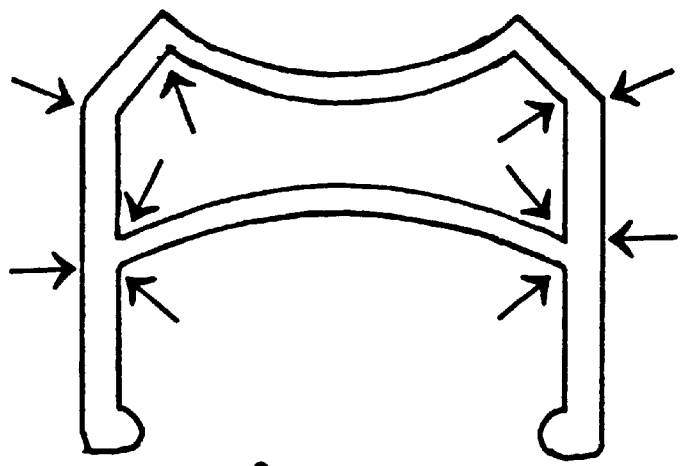
Figure 1C:
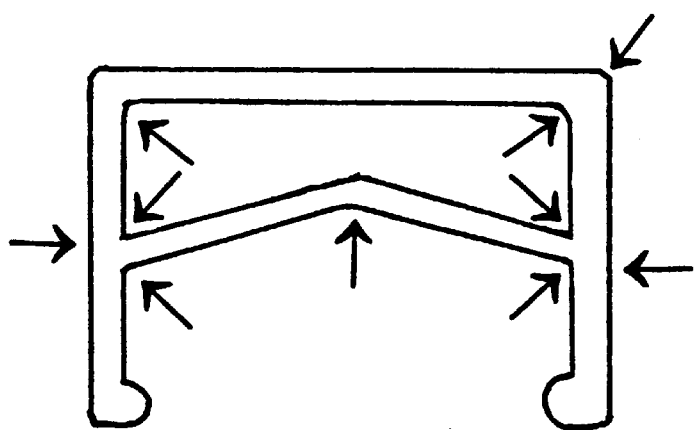

Aluminum is commonly considered to be lightweight and easily deformable, but also relatively brittle with poor abrasion resistance. While various aluminum alloys, including 6061 and 2014, are used in many articles of manufacture, repeated deformation of aluminum extrusions may result in fractures, particularly at hard angular junctions in spoked rims such as those depicted in FIGS. 1A–1C (arrows). Adding aluminum oxide to aluminum increases density as well as strength and stiffness, (e.g., TABLE 1, below). Anecdotal reports from mountain bike competitors suggest that some manufacturers may have tried unsuccessfully to develop MMC rims for mountain biking.

TABLE 1

Illustrative Effects of Al$_2$O$_3$ on Physical Properties of 6061 Aluminum Alloy

| Composition (% Al$_2$O$_3$) | Yield Strength (ksi) | Ultimate Strength (ksi) | Elongation (%) | Youngs Modulus Stiffness (Msi) | Density (lb/in$^3$) |
|---|---|---|---|---|---|
| 6061-0%-T6 | 40 | 45 | 17 | 10 | 0.098 |
| 6061-10%-T6 | 43 | 50 | 10 | 12 | 0.101 |
| 6061-15%-T6 | 47 | 53 | 6 | 13 | 0.103 |
| 6061-20%-T6 | 51 | 54 | 4 | 14 | 0.105 |

High density alloys, including NMC, can result in expensive tooling and excessive wear, particularly in extrusion dies. The instant rim profile was developed in an attempt to decrease extrusion die wear by creating relatively deep cross-sections with gradual changes in angle. In an attempt to develop a rim profile suitable for extrusion from relatively high density alloy materials, including MMC, a rim profile with unusual and somewhat unexpected performance characteristics was achieved.

Embodiments of the invention provide improved spoked wheels having extrudable rims with: increased competition life; increased impact resistance; lower weight to yield strength ratio; increased yield strength (e.g., ksi); increased Young's modulus stiffness (e.g., Msi), and increased ultimate strength (e.g., ksi) with decreased tensile elongation (e.g., % elongation). Deep rim profiles, and especially when extruded from higher density alloys, can be difficult to coil into wheel rims because they are subject to kinking and bending during coiling process. However, the latter difficulties were not encountered when the experimental rim extrusions from 6061–10% Al$_2$O$_3$-T5 were coiled. Some relatively remarkable performance attributes were achieved with these test wheels. Experimental spoked wheels comprising the instant rim profile were tested in mountain bike competitions and purposeful high impact mountain riding and they failed to lose their alignment despite destruction of a strong tubular bike frame from stress fracturing. In comparisons, mountain bike wheels assembled with the instant rim profile had increased competition life, remarkable impact-resistance, did not need repeated truing, had improved tire tracking, more even braking, increased brake life and more comfortable ride characteristics. The basis for improved impact-resistance is not completely understood, since stiffer, stronger aluminum alloy materials should theoretically be more brittle. While not wishing to be tied to any particular mechanism, it is possible that either MMC materials have some resilient features, e.g. a "metal memory", or alternatively, extrusion and/or coiling and stretching of the instant wheel rim profile may impart those properties. At a microstructural level, it is thought possible that "resilience" may mean that the MMC matrix-particle-boundary allows better shock absorption at high impact, fast compression, torsion or tension loading; or, resilience may result from more effective dispersal of vector forces or from more effective return of the material to its original unstressed state.

The following terms, as used herein, are intended to have meanings as follows: namely, "Metal memory" is used to mean that after deformation the subject material is effective in returning to its initial state without planar stress fracturing, cracking and/or metal fatigue. The instant rim profile appears to take advantage of these aspects of MMC.

"MMC" is used herein as an abbreviation for the term "metal matrix composite" and is intended to mean a metal matrix comprising a fixed "volume percentage" of a particulate material uniformly mixed therein. Preferably, the matrix comprises a low silicon aluminum alloy and the particulate material comprises an aluminum oxide or silicon carbide. Most preferably, the matrix comprises a 6061 aluminum alloy and the particulate comprises Al$_2$O$_3$ and the fixed volume percentage of the particulate comprises about 10% to about 30%.

"Competition life" is intended to mean the hours of use to which the subject article is subjected in a competition before its failure. "Competition" is intended to mean a staged and judged event in which the subject article is used by an individual with the intent of performing better than another individual. Representative examples of competitions include downhill mountain biking races, road races, time trials, performance trials and the like.

Embodiments of the invention provide MMC bicycle wheels comprising a rim extrusion having a profile imparting increased impact-resistance to side and frontal impacts, greater stiffness and strength, lighter weight, greater brake wear resistance, and accommodating of a higher spoke tension for better ride performance. The instant wheel responds better to torque, twisting, braking, side and frontal impacts, and to extreme compression, tension and torsional forces than wheels assembled with conventional aluminum alloy rims. In a presently preferred embodiment, a mountain bike wheel having a diameter of about 22 to about 26 inches, assembled with the instant rim extruded from 6061—10% Al$_2$O$_3$-T6 MMC has a weight of about 300 grams to about 400 grams and a rim stiffness that is about 18% to about 25% greater than a comparable rim extrusion prepared using just 6061 aluminum alloy. The instant rim extrusion is more wear resistant and has a competition life estimated to be about 3 to about 5 times longer than the best high performance aluminum alloy rims currently on the market. The instant rim extrusion is capable of accommodating a higher spoke tension that conventional rims, and provides a better ride.

In other aspects, embodiments of the invention provide mountain bike wheels assembled with the instant rims that are capable of withstanding high impact shock loading in real-world competitions, without deformation, denting, or running out of true. In other embodiments the invention provides lighter stiffer bicycle rims coiled from aluminum alloy MMC extrusions that have eliminated hard junction points and are capable of dispersing torsional and compression forces throughout the instant wheel rim.

Figure 2:
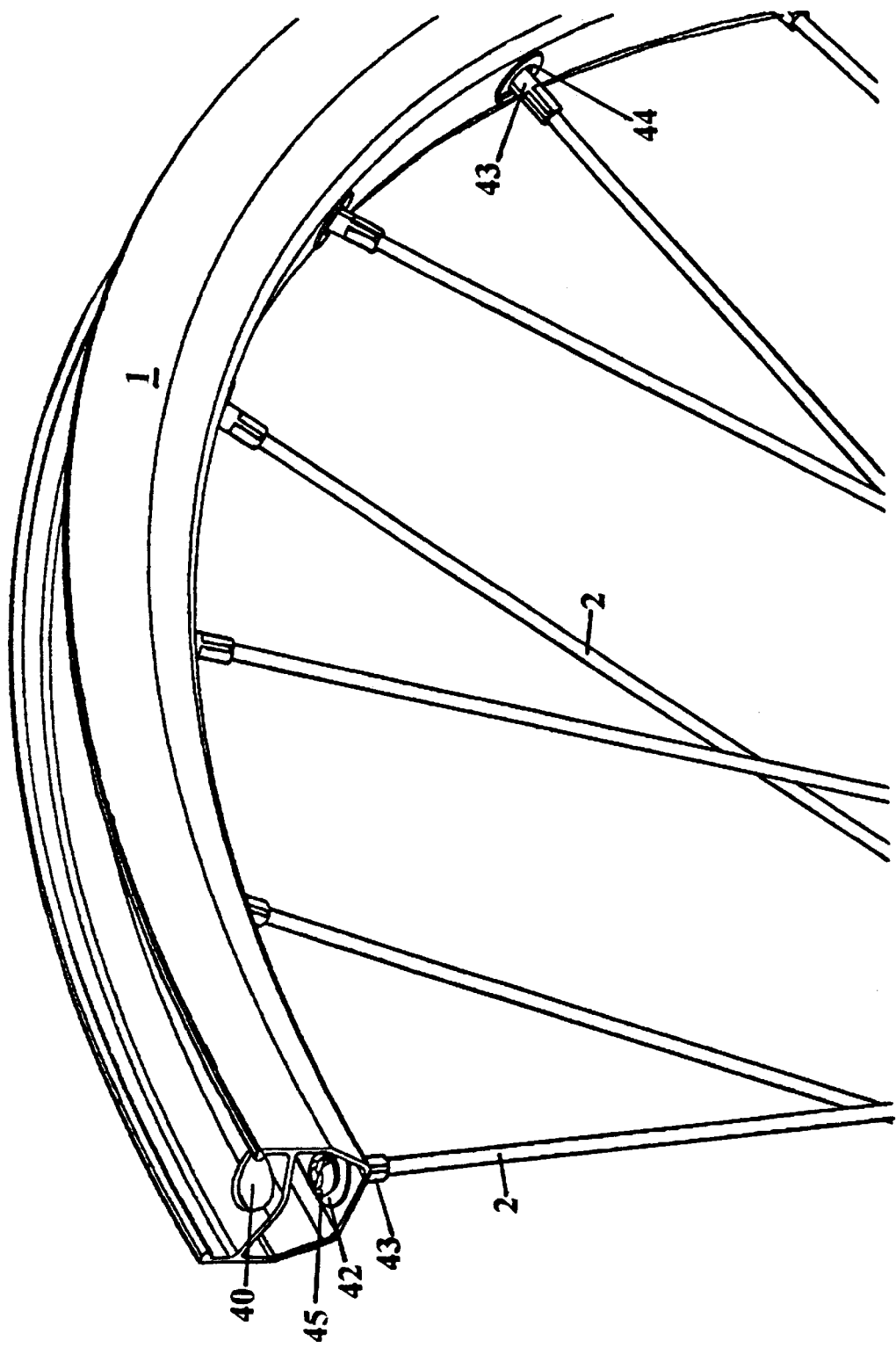
FIG. 2 depicts diagramatically a perspective portional view of a wheel according to the instant invention having an alloy rim extrusion for receiving a pneumatic tire and stainless steel spokes for establishing tensioned radial connections with a conventional bicycle hub (depicted in FIG. 5, below).
Figure 5:
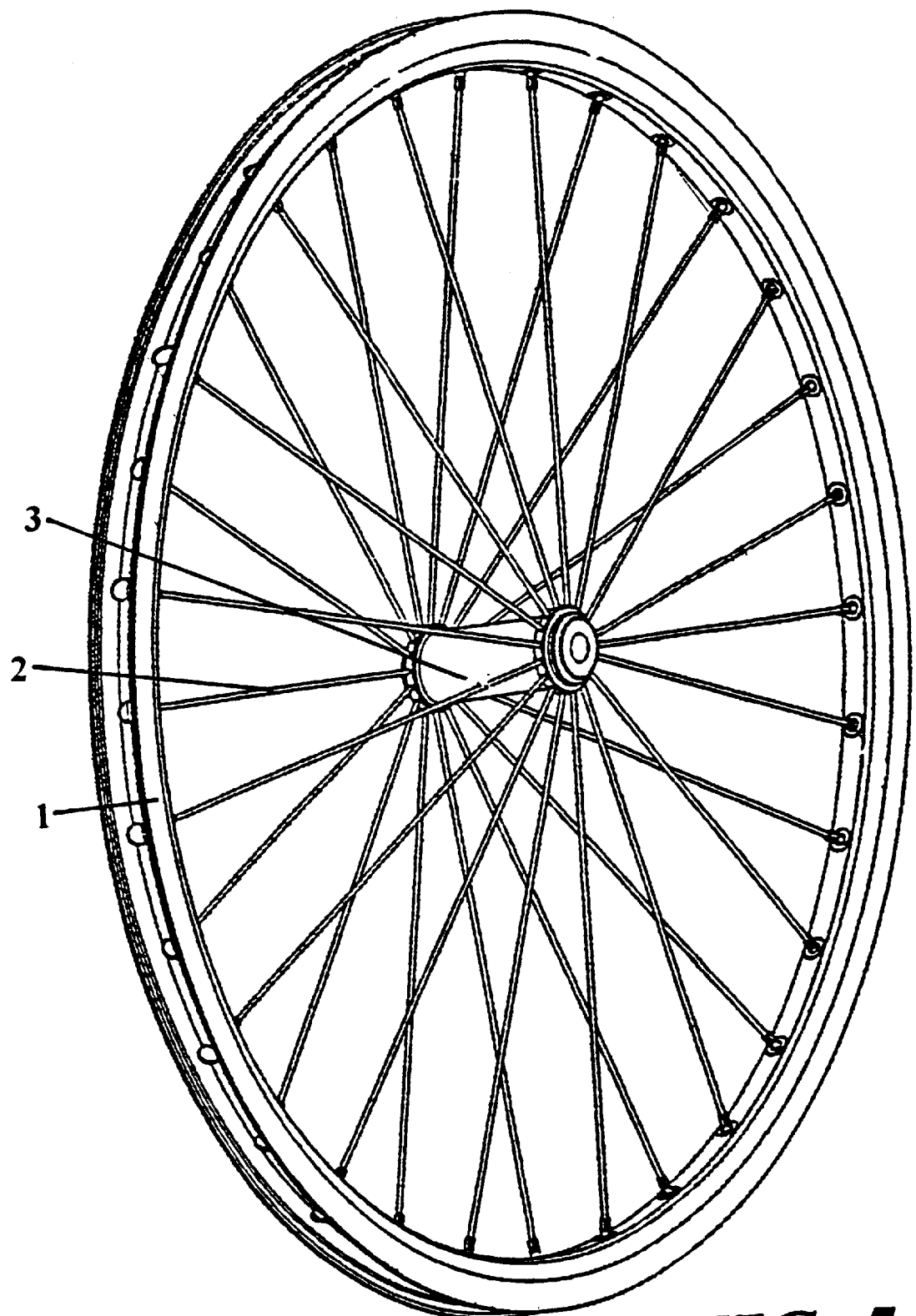
FIG. 5 depicts a wheel assembled with the rim of FIG. 2, FIG. 3A, and FIGS. 4A and 4B.

Referring to FIG. 2, the instant bicycle wheel assembly comprises rim 1; a central hub 3 (depicted in FIG. 5); a variable number of spokes 2 connecting the hub 3 with the instant rim 1 and adjustable to apply variable radial tension load between the instant rim 1 and the central hub 3; and, a pneumatic tire (not depicted) mounted in a rim cavity (as disclosed further below in regard to FIG. 3A). The spokes 2 are attached to the rim 1 using spoke nipples 43. An internal portion 45 of spoke nipple 43 bears against the internal portion 42 of an eyelet which reinforces the hole in the rim. The eyelet has an internal portion 42 and an external portion 44, both of which bear against the rim to keep the eyelet in place and distribute the spoke loads into the rim. A portional perspective cross-sectional view of a spoked rim 1 subassembly is provided in FIG. 2. in Rim 1 provides basis for the instant improved wheel, and a variety of different conventional stainless steel spokes and alloy hubs may prove suitable for use in constructing the instant wheel, in so far as those components are compatible with the aspects of the instant invention, as disclosed herein.

Figure 3A:
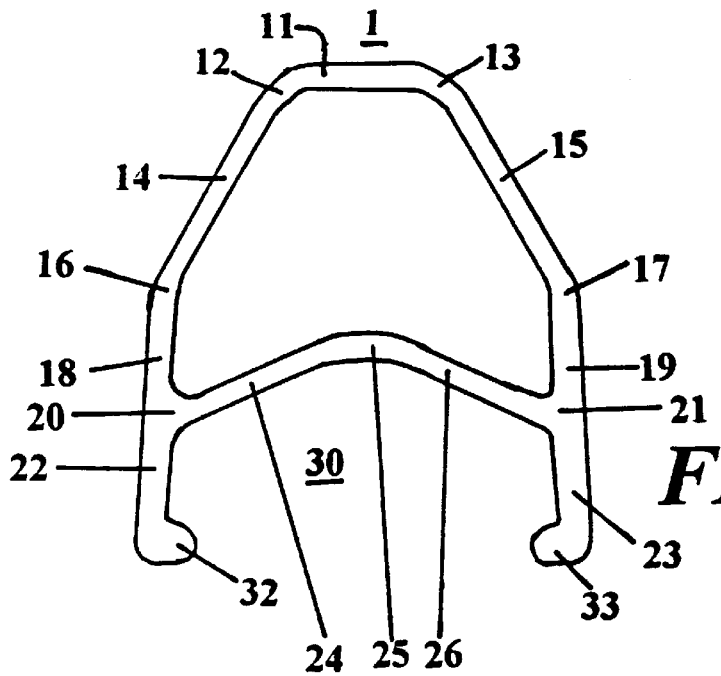
FIG. 3A, 3B and 3C depict diagrammatically three cross-sectional views illustrating different aspects of the instant extrudable wheel rim profile having advantageous performance characteristics, as described further below.

Referring to FIG. 3A wherein appears a cross-sectional view of the profile of rim 1, spokes 2 (FIG. 2) transmit tension load (supra) to rim 1 at spoke load bearing portion 11. Tension forces applied at load bearing portion 11 are transmitted through integral load diverting angle portions 12,13 into left and right tension member portions 14,15.

Rim cavity 30 (FIG. 3A) is capable of receiving a variety of conventional pneumatic tires with tubes (not depicted), or, if extruded of an MMC its stiffness may provide for use of a tubeless tire. Cavity 30 is formed on its lateral margins by rim side wall portions 22,23 and at its inner margin by components of transverse torque converter yolk 24,25,26. The tire bead is retained and pneumatically sealed in position by annular beads 32,33 integral with rim side wall portions 22,23.

Impact forces applied to rim 1 as torsion, tension and compression forces at the pneumatic tire mounted in rim cavity 30, are transmitted into rim side wall portions 22,23. Forces accumulated in rim side wall portions 22,23 are separated and vector forces diverted through: (i) left and right Y-member portions 20,21 into transverse torque converter yoke portions 24,26 and (ii) force transfer ring portions 18,19. Force transfer ring portions 18,19 are integral with angle portions 16,17. Forces received at ring portions 18,19 are transferred into the left and right tension member portions 14,15, and then through load diverting angle portions 12,13 into spoke load bearing portion 11 and eventually into spokes 2. Transverse torque converter yoke portions 24,26 are integral with curved yoke torque connector 25.

Lateral exterior surfaces of rim side wall portions 22,23 and force transfer ring portions 18,19 provide a braking surface for brake pads of a caliper-actuated bicycle brake.

Figure 3B:
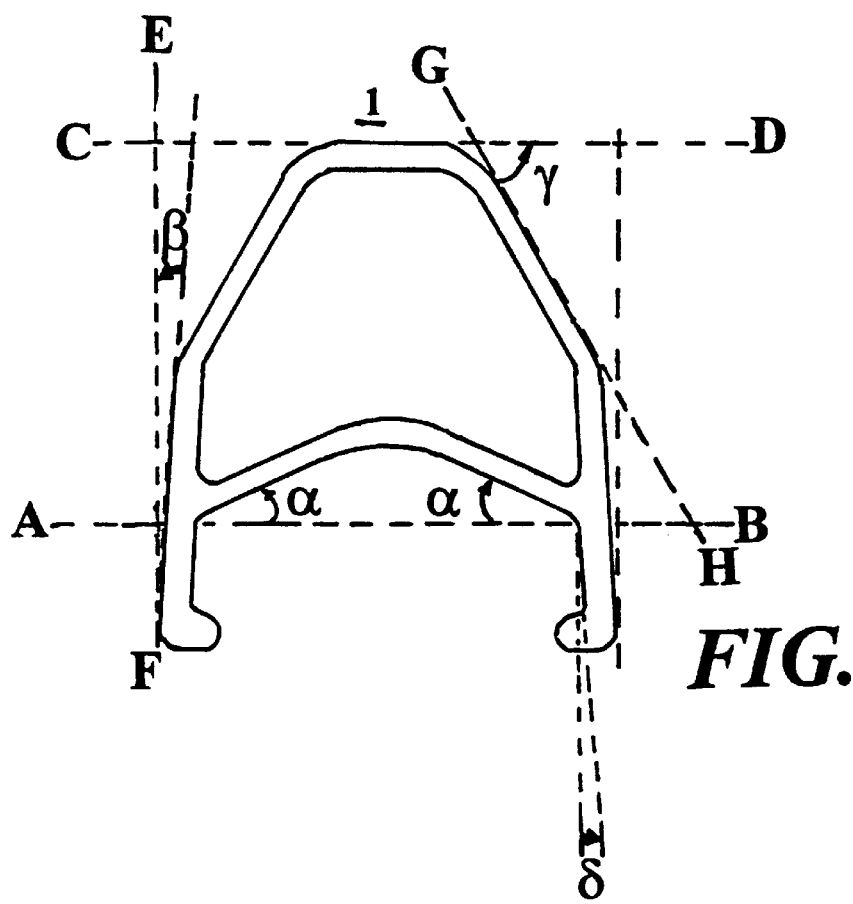

Referring to FIG. 3B, (also making reference to FIG. 3A for numerical designations), additional aspects of rim 1 are described. Reference lines A–B and C–D (dashed lines; FIG. 3B) are parallel one to the other, and referred to for defining "horizontal planes" in rim 1. Line E–F is perpendicular with both A–B and C–D, and referred to for defining "vertical planes" in rim 1. "Inner" refers to rim portions located toward spoke load bearing portion 11 and "outer" refers to rim portions located toward tire cavity 30.

Embodiments of the invention provide wheel rim 1 having transverse torque converter yoke portions 24,26 forming a torque transfer angle "α" (FIG. 3B) with horizontal plane A–B. For optimal extrusion and torque transfer, torque transfer angle α is about 20 degrees to about 45 degrees, preferably about 20 degrees to about 30 degrees, and most preferably about 22 degrees to about 28 degrees. Curved yoke torque connector 25, centrally located and integral with converter yoke portions 24,26, has an inner surface having a radius "$r_1$" (FIG. 3C) of curvature of about 0.22 inches to about 0.34 inches, preferably about 0.25 inches to about 0.32 inches and most preferably about 0.280±0.030 inches. Yoke torque connector 25 also has an outer surface having a radius "$r_2$" (FIG. 3c) of curvature of about 0.26 inches to about 0.38 inches, preferably about 0.29 inches to about 0.35 inches, and most preferably about 0.320±0.030 inches.

In other embodiments, the invention provides wheel rim 1 wherein the lateral surfaces of rim side wall portions 22,23 and force transfer ring portions 18,19 comprise an impact transfer angle "β" (FIG. 3B) with vertical plane E–F. For optimum extrusion and impact transfer, impact transfer angle β is about 2 degrees to about 4 degrees, preferably about 2.5 degrees to about 3.5 degrees, and most preferably about 3 degrees. In addition, the tire cavity surface of rim side wall portions 22,23 comprise torsion transfer angle "δ" relative to the vertical plane (as depicted in FIG. 3B). For optimal transfer of forces into transverse torque converter yoke portions 24,26, torsion transfer angle δ is about 3 degrees to about 7 degrees, preferably about 4 degrees to about 6 degrees and most preferably about 5 degrees. With the following limitation set for the values of β and δ, namely, that the subtractive difference between torsion transfer angle δ and impact transfer angle β shall always be greater than 2 degrees. The instant subtractive angular difference provides an increased strength and improved force transfer through left and right Y-member portions 20,21 into transverse torque converter yoke portions 24,26. Spoke tension and load transfer through load diverting angle portions 12,13 into spoke load bearing portion 11 is optimally achieved where angle "γ" (FIG. 3B) is about 40 degrees to about 50 degrees, preferably about 42 degrees to about 48 degrees and most preferably about 44 degrees to about 48 degrees.

Embodiments of the invention provide and improved wheel rim 1 having decreased weight and increased strength by varying the thickness of the extrusion to match strength requirements in different portions of the instant rim 1. To provide strength, wall thickness in spoke load bearing portion 11 (FIG. 3A) and in rim force transfer ring portions 18,19 are both about 0.045 inches to about 0.055 inches, preferably about 0.048 inches to about 0.052 inches and most preferably about 0.050 inches. To decrease weight, wall thickness in transverse torque converter yoke portions 24,25, 26 is about 0.033 inches to about 0.044 inches, preferably about 0.038 inches to about 0.042 inches and most preferably about 0.040 inches.

Figure 3C:
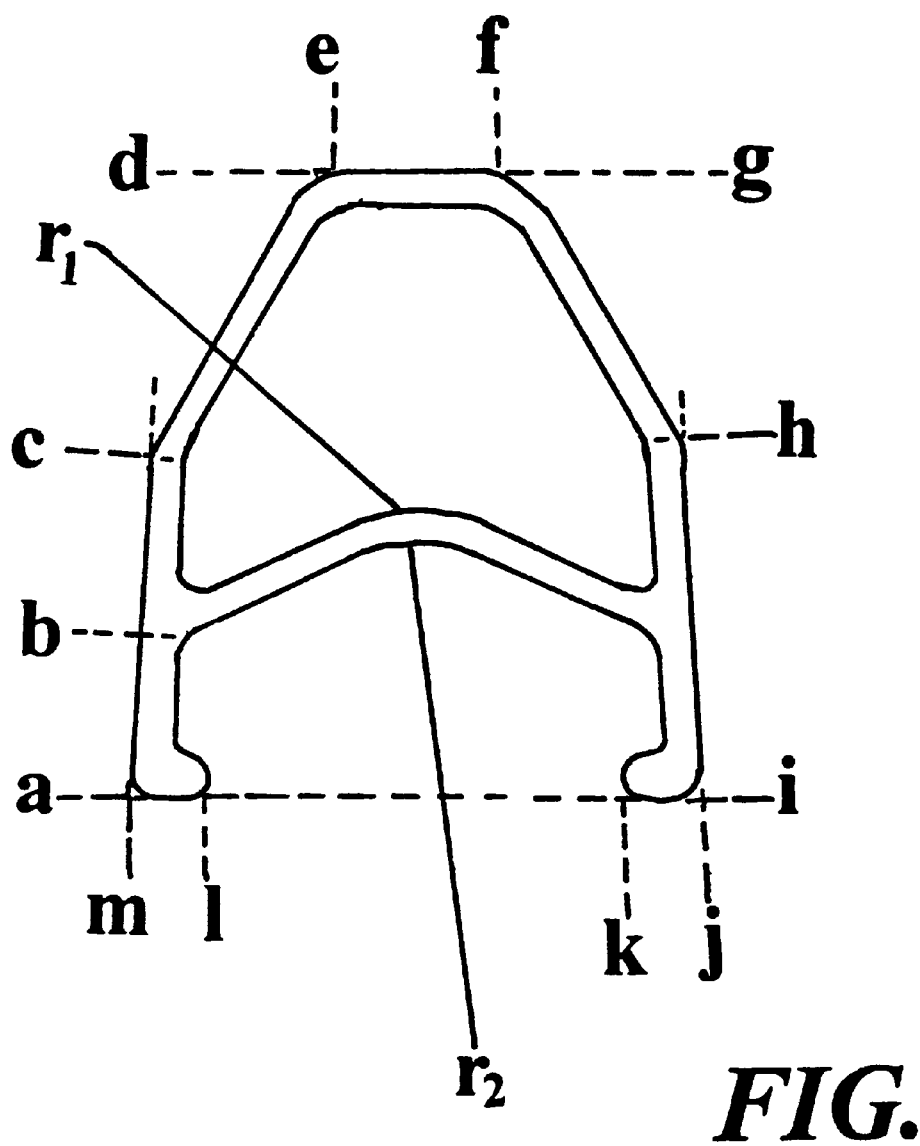
Figure 4A:
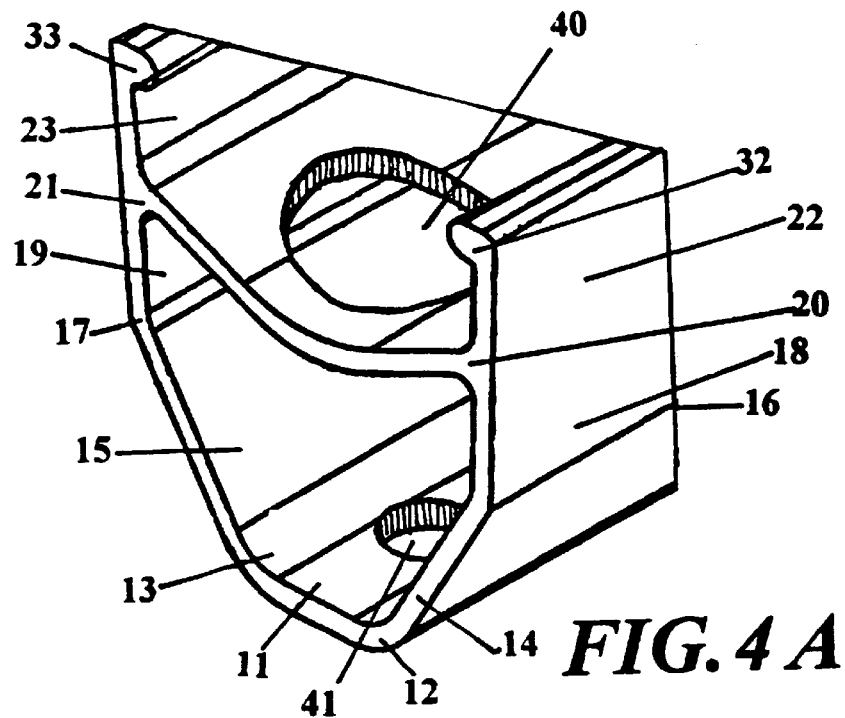
FIGS. 4A and 4B depict different aspects of a portional cross-sectional view of an extrudable wheel rim profile as described in greater detail below.
Figure 4B:
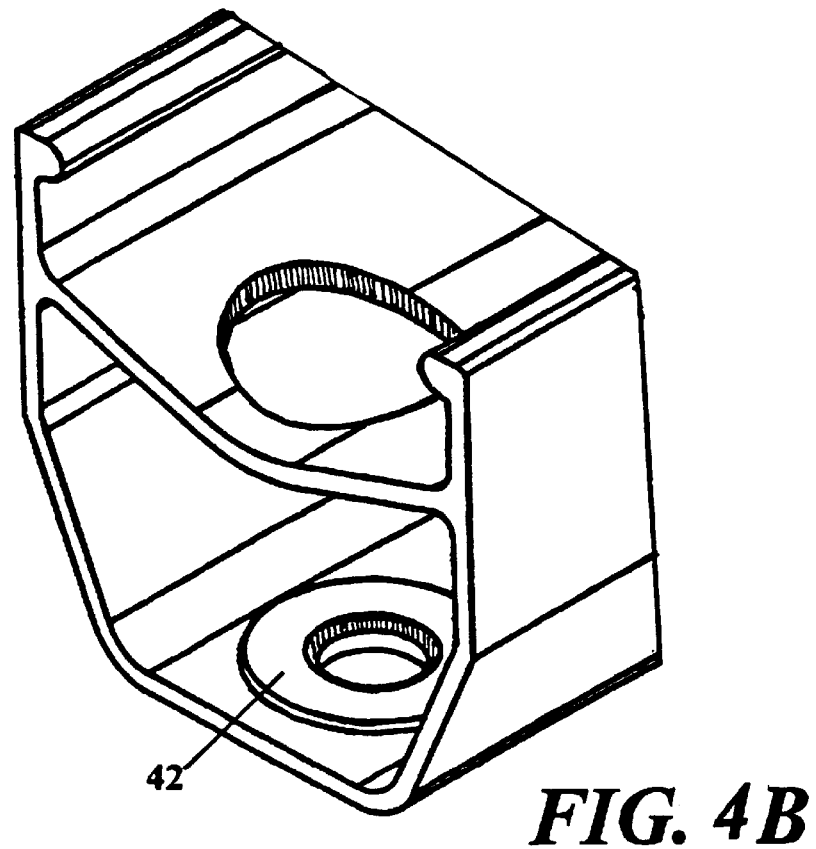

Dimensions for an illustrative rim 1 suitable for use in a mountain bike are disclosed in TABLE 2, below, making reference to FIG. 3C.

TABLE 2

Dimensions of an Illustrative Rim Suitable for Use in a Mountain Bike Wheel

| Distance from Point | Inches |
| --- | --- |
| a-to-d or i-to-g (along a vertical plane) | 0.945 |
| a-to-c or i-to-h (along a vertical plane) | 0.506 |
| c-to-d or h-to-g (along a vertical plane) | 0.439–0.506 |
| m-to-j (along a horizontal plane) | 0.846 |
| c-to-h (along a horizontal plane) | 0.797 |
| e-to-f (along a horizontal plane) | 0.314–0.400 |
| a to b (along a vertical plane) | 0.261 |
| l-to-m or k-to-j (along a horizontal plane) | 0.11 |

Embodiments of the invention provide a rim 1 profile capable of extrusion from a variety of alloys including titanium, aluminum-magnesium alloys, aluminum-beryllium alloys and the like containing a variety of different ceramic particles, e.g., alumina ($Al_2O_3$), aluminum carbide, aluminum nitride, boron carbide, Silicon carbide and silicon nitride. The geometry of the subject ceramic particles includes discontinuous granular, spherical, whiskers, platelets and the like; and, a range of major diameters in the range of about 0.5 microns to about 200 microns. Ceramic fiber particulate including short fibers having an aspect ratio greater than about 10, as well as continuous fibers having diameters of about 0.5 microns to about 200 microns.

In a presently preferred embodiment the instant rim 1 is extruded from a low silicon 6061 aluminum magnesium alloy MMC having about 4% to about 30% of the subject ceramic particulate. In a presently preferred embodiment, the instant rim 1 is extrudable from a low silicon 6061 aluminum magnesium alloy MMC having about 5% $Al_2O_3$ to about 30% $Al_2O_3$, preferably about 10% to about 20% $Al_2O_3$, and most preferably about 8% $Al_2O_3$ to about 12% $Al_2O_3$, all of which subject alloys are in a T5 or T6 heat-treated condition.

Embodiments of the invention provide wheels formed by cutting to length, "coiling" (an accepted term in the art) the instant rim 1 into a hoop having a coiled outside dimension of about 8 inches to about 36 inches. The instant coiled hoop rim 1 is useful in assembling a variety of wheels for use in motor- and human-driven cycles including motor cycles; wheelchairs; including racing, sport and utility; and bicycles, including road, touring, mountain and BMX. After cutting and coiling, the ends of the instant rim are joined by welding, e.g., TIG, MIG, resistance, laser or electron beam with or without filler materials; or alternatively, by inserting a mechanical union between the two ends of the hoop, and gluing it, and the two ends of the hoop together using an adhesive. Adhesive bonding of bicycle wheel rims is routine in the art.

In a presently preferred embodiment, the instant rim 1 hoop has a coiled outside dimension of about 571 mm +/−0.5 mm (22.48+/−0.020 inches). Referring to FIGS. 4A–4B, 5 and FIG. 2, spaced spoke holes 41 (FIG. 2, 4A–B) are drilled in spoke load bearing portion 11, and corresponding spoke access holes 40 are drilled through transverse torque converter yolk portion 25. Spoke holes 41 are spaced evenly around rim 1 for receiving about 18 to about 36 spokes, one spoke 2 per spoke hole 41. Preferably, about 28 to about 36 spokes are installed evenly spaced around the instant rim 1, and in a presently preferred embodiment 36 spokes are installed in a radial orientation. Preferably, spoke holes 41 having a diameter of about 0.139 inches to about 0.166 inches are drilled in spoke load bearing portion 11; and, most preferably spoke holes 41 have a diameter of about 0.166 inches.

To remove a broken spoke many conventional rim designs in the art, require removal of the tire from the rim to gain access to the spoke retainer. Embodiments the invention provides a rim from which the spokes may be removed without need to remove the tire. Rim 1 extruded from 6061-MMC alloy (supra) provides sufficient rim strength to allow spoke holes 41 to be tapped with threads to receive the male screw portion of a spoke or spoke nipple. In one optional embodiment, spoke holes 41 may have a sidewall keyway recess for retaining screw insert 42, and in this embodiment spoke nipples 2 are threaded directly into insert 42. Alternatively, conventional spoke nipples may be inserted into spoke holes 41 and fastened in place with conventional spoke nuts inserted through spoke access holes 40. Most preferably, spoke access holes 40, have a diameter of about 0.375 inches. Spoke holes 41 may be drilled about +5 degrees and −5 degrees off the center axis, alternating + or − at every other hole with the center of each spoke hole 41 on the center line on the inner surface of spoke load bearing portion 11. In alternative embodiments, spokes are installed in either a crossed spoke pattern, or a uniform radial pattern. For wheel assembly, spokes are connected to hub 3 (FIG. 5) using methods common in the art, attached to the instant rim 1 (supra) and the spoke tension is adjusted. Embodiments of the invention provide a stronger lighter rim where spokes may be adjusted to a greater tension than in conventional wheels, thereby achieving certain improvements in ride characteristics including at least stiffness and more accurate tire tracking.

Final finishing of the instant wheels may include a range of surface coatings, e.g. wet painting, dry powder coating, metallic plating, oxide coating (oxidizing), and metal or ceramic spray coating processes.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An impact resistant spoked wheel comprising a rim adjustably connected with a plurality of spokes each of which is fixedly connected with a hub and with the rim, wherein said rim comprises:

a left and a right transverse torque converter yoke portion, each of which is integral on one end with a vertical rim side wall portion and on another end with a curved yoke torque connector portion, wherein each of said rim side wall portions is integral with a left or a right tension member portion integral with a respective left side or a right side of a spoke load bearing portion, wherein each of said rim side wall portions forms a torque transfer angle of about 20 degrees to about 45 degrees with a horizontal plane passing through an outer surface of said transverse torque converter portion, and wherein said yoke torque connector portion comprises a radius of curvature of about 0.22 inches to about 0.34 inches;

the rim being formed using a metal matrix composite (MMC) having a matrix selected from among an aluminum alloy, a magnesium alloy, a titanium alloy, a beryllium alloy or mixtures thereof, and having a plurality of particles therein selected from among alumina, silicon carbide, aluminum nitride, boron carbide and silicon nitride; and wherein said spoke load bearing portion is capable of receiving said plurality of spokes, and said vertical rim side wall portions and said transverse torque converter yoke portion comprise a tire cavity capable of reversibly receiving and sealing a pneumatic tire to said impact resistant spoked wheel.

2. The impact resistant spoked wheel of claim 1, wherein each of said rim side wall portions comprises a lateral exterior surface that forms an angle of about 2 degrees to about 4 degrees with a vertical plane passing through the widest point of said rim.

3. The impact resistant spoked wheel of claim 1, wherein each of said left or a right tension member portions forms an angle of about 40 degrees to about 50 degrees with a vertical plane passing through each of said ends of said spoke load bearing portions.

4. The impact resistant spoked wheel of claim 1, wherein the metal matrix composite comprises a low silicon aluminum magnesium alloy having about 5 percent to about 30 percent by volume of alumina particles therein.

5. The impact resistant spoked wheel of claim 4, wherein said volume of alumina particles comprises about 10 percent to about 20 percent by volume of said alloy.

6. The impact resistant spoked wheel of claim 5, wherein said volume of alumina particles comprises about 8 percent to about 12 percent of said alloy.

7. The impact resistant spoked wheel of claim 6, wherein the alloy contains about 10 percent by volume of alumina particles.

8. The impact resistant spoked wheel of claim 4, wherein the aluminum magnesium alloy is 6061 or 2014.

9. The impact resistant spoked wheel of claim 5, wherein the aluminum magnesium alloy is 6061 or 2014.

10. The impact resistant spoked wheel of claim 6, wherein the aluminum magnesium alloy is 6061 or 2014.

11. The impact resistant spoked wheel of claim 6, wherein the aluminum magnesium alloy is 6061.

12. The impact resistant spoked wheel of claim 1, further comprising a plurality of threaded spoke hole in said rim for receiving said plurality of spokes.

* * * * *